July 19, 1949.       C. A. LOVELL       2,476,747
ELECTRICAL COMPUTING SYSTEM
Filed April 25, 1942
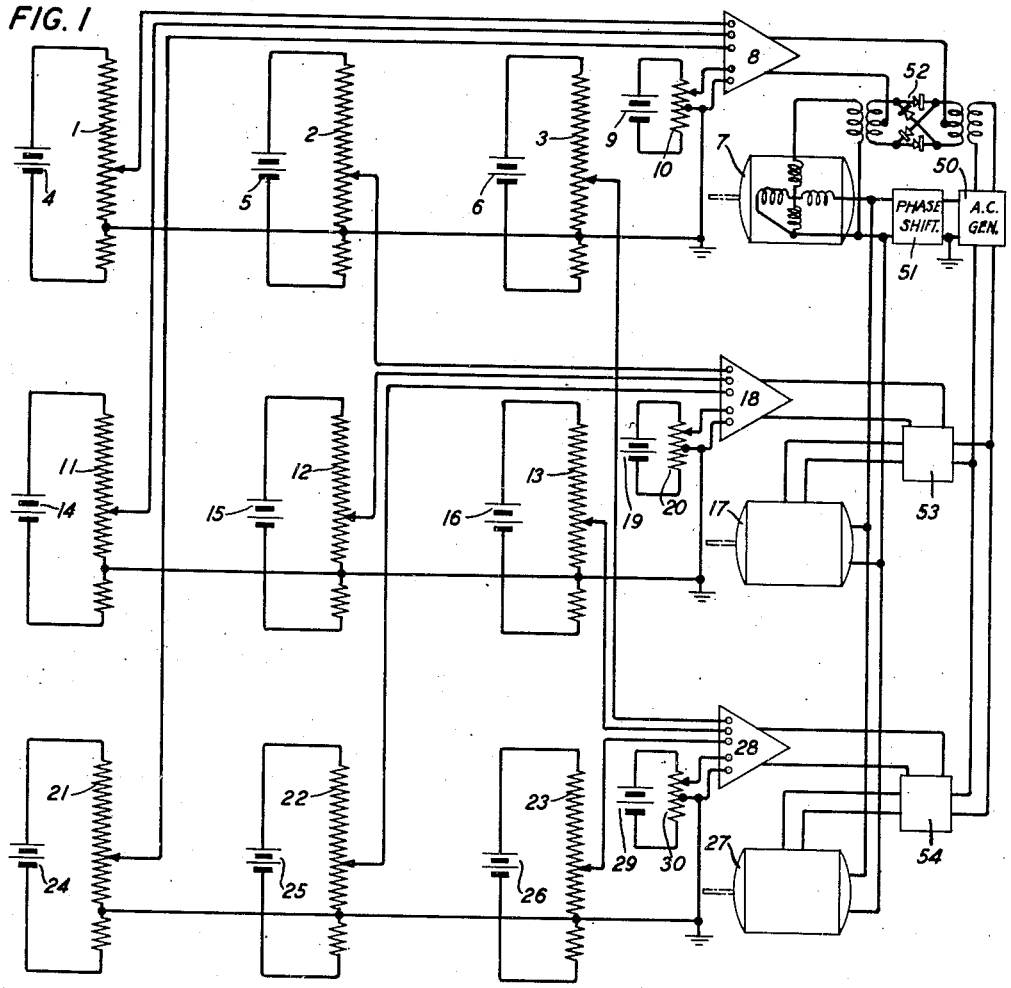
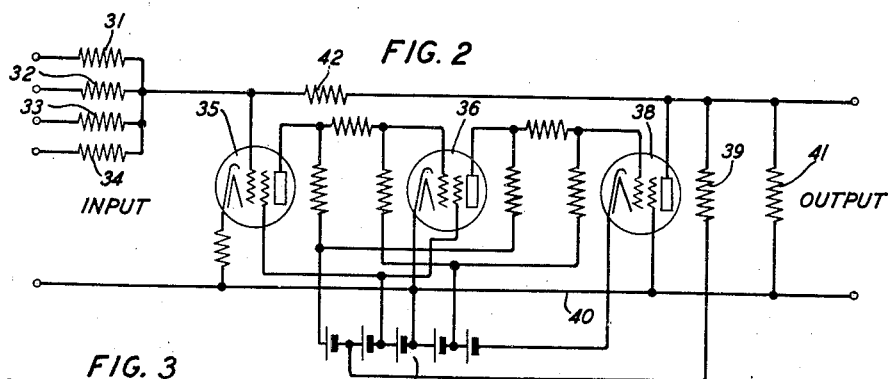
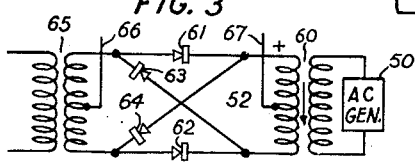
INVENTOR
C. A. LOVELL
BY
W. R. Dawson
ATTORNEY Patented July 19, 1949

2,476,747

UNITED STATES PATENT OFFICE 2,476,747

ELECTRICAL COMPUTING SYSTEM

Clarence A. Lovell, Maplewood, N. J., assignor to Bell Telephone Laboratories, Incorporated, New York, N. Y., a corporation of New York Application April 25, 1942, Serial No. 440,504

4 Claims. (Cl. 235—61)

This invention relates to electrical computing systems including comparison circuits associated with servomotors.

The present application is a continuation, in part, of my joint application, Serial No. 391,439, filed May 1, 1941 by C. A. Lovell, D. B. Parkinson and B. T. Weber, now United States Patent 2,404,387, granted July 23, 1946.

The object of the invention is the solution of a system of simultaneous equations in which the data are represented by electrical quantities.

A feature of the invention is a plurality of comparison circuits, individually associated with servomotors which tend to maintain standard voltages across the inputs of the circuits, interconnected in such a manner that, when electrical quantities representing the terms of a system of equations are supplied to the circuits, and the servomotors have adjusted the inputs to the circuits to the standard value, the positions of the shafts of the servomotors will represent the solutions of the equations.

The nature of the present invention may conveniently be expressed in the form of a generalized formula. In a system having $n$ comparison circuits, each associated with a servomotor, the $n$ circuits may be interconnected to solve a system of $n$ equations. In this case, before the solution is reached, there will be $n$ deviation voltages, and each deviation voltage will have some term, or terms, which are respectively under the control of each one of the servomotors. Each deviation voltage $\delta e_i$ will have the form $$\delta e_i = \sum_{j=1}^{n} a_{ij} x_j + b_i$$

where $x_j$ represents the $n$ variables which contribute to produce the deviation voltage, and the terms $a_{ij}$ and $b_i$ are constants of the equations.

If the windings of the potentiometers used in the system have resistances per unit length varying with a desired function, instead of a linear variation in resistance, the system will then solve a series of simultaneous non-linear equations. In this case the deviation voltage $\delta e_i$ will have the form $$\delta e_i = \sum_{j=1}^{j=n} a_{ij} f_j(x_j) + b_i$$

where $f_j$ is the function represented by the variation in resistance per unit length of the winding of a potentiometer.

In a system in accordance with the present invention, each deviation voltage contains terms respectively under the control of each one of the servomotors. For the purpose of discussion, and not as any limitation on the scope of the invention, assume a system of three simultaneous equations in three unknowns, which may be represented in the following form:

$$a_1 x + b_1 y + c_1 z + d_1 = 0$$
$$a_2 x + b_2 y + c_2 z + d_2 = 0$$
$$a_3 x + b_3 y + c_3 z + d_3 = 0$$

in which $x$, $y$, $z$ are the three unknowns, $a_1$, $a_2$, $a_3$, $b_1$, $b_2$, $b_3$, $c_1$, $c_2$, $c_3$ are given constants and $d_1$, $d_2$, $d_3$ are independent constants. If the following conditions are satisfied:

$$\begin{vmatrix} a_1 b_1 c_1 \\ a_2 b_2 c_2 \\ a_3 b_3 c_3 \end{vmatrix} \neq 0$$

and not all the $d$'s are zero, then the system will determine the absolute magnitudes of all the variables. If the equations are homogeneous, i. e., if all the $d$'s are zero, the above determinant must be zero if non-trivial solutions are to exist. In this case the system will determine the ratios between all the variables, but not the absolute magnitudes of the variables.

Other modifications, features and advantages of the invention will be apparent from the following description, and the drawings in which:

Fig. 1 schematically shows an embodiment of the invention;

Fig. 2 shows a summing repeater.

Fig. 3 shows the phase controlling network of Fig. 1.

In Fig. 1 the potentiometers 1, 2, 3 have windings varying in resistance per unit length in accordance with the given functions of $x$; similarly the potentiometers 11, 12, 13 and 21, 22, 23 have windings respectively varying in resistance per unit in accordance with the given functions of $y$ and $z$. These functions may be linear, or mathematical functions, or a series of empirical values, and may pass through zero, but the functions should be continuous. If any of the functions is wholly positive or wholly negative, one end of the winding of the corresponding potentiometer may be connected to the common lead of the circuit, preferably ground. If the function passes through zero, the corresponding winding, as shown may be grounded at the intermediate point which represents the zero value of the function.

The windings of the potentiometers 1, 2, 3; 11, 12, 13 and 21, 22, 23 are respectively connected to sources of electrical voltages, conventionally represented by the batteries 4, 5, 6; 14, 15, 16 and 24, 25, 26. The voltages supplied by these sources are of magnitudes to represent the maximum values of the corresponding terms in the equations to be solved. These voltages may be constant or may be varying in accordance with some variable quantity, such as a distance, pressure, area, volume, time or any other quantity.

The windings of the potentiometers 1, 2, 3 may be formed of a thin strip of resistance material cut to the desired shape, or of a thin strip of material cut to the desired shape and wound with insulated resistance wire, the insulation being removed along the area contacted by the wipers. The windings may conveniently be formed around the circumferences of concentric circles, as shown in United States Patent 2,404,387, July 23, 1946, C. A. Lovell et al., the wipers being rotated about the common center, or the windings may be linear, and the wipers linearly displaced. The wipers are driven by the shaft of the motor 7, either directly, or through suitable gearing, flexible shafts, or any other desired transmission. The wipers of the potentiometers 1, 2, 3 are insulated from the shaft, and from each other, and connections, such as slip rings or pigtails are used to apply the voltages selected by the wipers to the rest of the system. The potentiometers 11, 12, 13 and 21, 22, 23 may, if desired, be similar to the potentiometers 1, 2, 3 and the wipers of these potentiometers are respectively driven by the motors 17 or 27.

The voltages selected by the wipers of the potentiometers 1, 11, 21 are supplied to the input of a summing repeater 8, which may be of the type shown in Fig. 2.

The winding of the potentiometer 10 has a resistance per unit length varying with the function representing the independent term of the first equation and is connected to a source of voltage 9 having a magnitude representing the maximum value of the independent term. The wiper of the potentiometer 10 is adjusted to the required value of the independent term, and is not under the control of the motor 7. The voltage selected by the wiper of the potentiometer 10 is also applied to the summing repeater 8.

The potentiometers 20 and 30 are similarly designed and adjusted to select voltages respectively representing the independent terms in the second and third equations. The complete computer may be described as an electrical network, having a number of meshes formed by the potentiometers and their current supplies, each mesh including a current supply and a resistor in parallel, the meshes eventually being adjusted so that the voltage drops across the portions of the resistors from the wipers to ground are proportional to the terms in the equations.

The voltages selected by the wipers of the potentiometers 2, 12, 22 and 20 are supplied to a summing repeater 18, which may be of the type shown in Fig. 2. Similarly, the voltages selected by the wipers of the potentiometers 3, 13, 23, 30 are supplied to the summing repeater 28.

Depending upon the values involved in the equations to be solved, it will be understood that any of the voltages selected by any of the wipers may be zero, or may pass through zero and have either a positive or a negative value.

The summing repeater shown in Fig. 2 is of the type disclosed in United States application Serial No. 391,331, filed May 1, 1941, by K. D. Swartzel, Jr., now United States Patent 2,401,779, granted June 11, 1946, and assigned to the assignee of the present application.

The voltages selected by the wipers of the potentiometers 1, 11, 21, 10 are respectively applied through the resistors 31, 32, 33, 34 to the input circuit of the vacuum tube 35, which may, if desired, have the usual grid biasing cathode resistor. The anode of the vacuum tube 35 is coupled to the input circuit of the vacuum tube 36 by any suitable interstage network, such as the network shown in United States Patent 1,751,527, March 25, 1930, H. Nyquist. Suitable anode and screen potentials are supplied by the source 37. The vacuum tube 36 is similarly coupled to the input circuit of vacuum tube 38.

The cathode of vacuum tube 38 is connected to the negative pole of the source 37, while the anode of the vacuum tube 38 is connected through the coupling resistor 39 to a positive tap of the source 37. An intermediate tap of the source 37 is connected to wire 40, which is connected to one terminal of the input, and one terminal of the output circuits of the network and may conveniently be grounded.

Current from the positive tap of the source 37 flows through resistor 39 and the anode-cathode path of vacuum tube 38 to the negative pole of the source 37. The circuit constants are so chosen that, in the absence of a signal voltage applied to the control electrode of vacuum tube 35, the voltage drop in resistor 39 is equal to the voltage between wire 40 and the positive tap of the source 37; thus the anode of vacuum tube 38 is at the same potential as the wire 40, and no potential difference is applied to the load resistor 41. When a signal voltage is applied to the vacuum tube 35, the amplified voltage on the control grid of vacuum tube 38 decreases or increases the anode current of vacuum tube 38 causing a positive or negative difference of potential to be applied across the load resistor 41. A large amount of negative feedback is supplied through resistor 42 from the anode of vacuum tube 38 to the input circuit of vacuum tube 35. This feedback is large enough that the input impedance of the vacuum tube 35 is reduced to a value small compared with the resistances of the resistors 31, 32, 33, 34, and the overall gain of the network is dependent substantially entirely upon the resistance of the resistor 42. By suitable choice of the circuit parameters, the voltages applied to the resistors 31, 32, 33, 34 operate independently without reactions and the voltage across the resistor 41 is the sum of the voltages applied to the resistors 31, 32, 33, 34.

Current is supplied from the alternating current generator or oscillator 50, through the phase-shifting network 51 which may be of the type shown in United States Patent 511,560, December 26, 1893, N. Tesla, to one winding of the motors 7, 17, 27. The source 50 and network 51 may, if desired, be replaced by a two-phase generator. Current is also supplied from the generator 50 through the phase-controlling network 52 which may be of the type shown in Fig. 3, to the other winding of the motor 7. The network of Fig. 3 is balanced so that, with no direct current flowing from leads 66, 67, no alternating power is transmitted from the generator 50 to transformer 65. With a direct current flowing from leads 66, 67 the alternating voltage developed in transformer 65 by power from the source 50 will depend in amplitude upon the amplitude of the direct current, and will depend in phase upon the polarity of the direct current. Reversing the polarity of the direct current will reverse the phase of the alternating voltage. Current from the output of the repeater 8 is supplied to the network 52 and controls the magnitude and phase of the current supplied to the motor 7 in accordance with the magnitude and polarity of the current from the repeater 8, to cause the motor 7 to rotate in the proper direction, moving the wipers of potentiometers 1, 2, 3.

The outputs of the repeaters 18, 28 are respectively applied to networks 53, 54 to similarly control the motors 17, 27.

While one specific form of motor and control has been described, it will be understood that there are many other servomotors and control circuits, such as those shown in United States Patents 1,086,729, 1,268,712 and 1,586,233, which may be used to control the positions of the wipers on the various potentiometers.

The maximum voltages applied to the windings of the potentiometers 1, 2, 3 may be designated by $a_1x_0$, $a_2x_0$ and $a_3x_0$, respectively, and the voltages selected by the wipers may be designated by $a_1x$, $a_2x$ and $a_3x$. Similarly, for the potentiometers 11, 12, 13 the maximum voltages will be $b_1y_0$, $b_2y_0$ and $b_3y_0$ and the selected voltages will be $b_1y$, $b_2y$ and $b_3y$; and, for the potentiometers 21, 22, 23 the maximum voltages will be $c_1z_0$, $c_2z_0$ and $c_3z_0$, and the selected voltages will be $c_1z$, $c_2z$, and $c_3z$. The voltages selected by the wipers of the potentiometers 10, 20, 30 will be designated by $d_1$, $d_2$ and $d_3$. The system shown will continuously solve the simultaneous equations:

$$a_1x+b_1y+c_1z+d_1=0$$
$$a_2x+b_2y+c_2z+d_2=0$$
$$a_3x+b_3y+c_3z+d_3=0$$

the positions of the shafts of the motors 7, 17 and 27 respectively indicating the values of $x$, $y$ and $z$.

The voltages $d_1$, $d_2$ and $d_3$ may be constant, or they may be continually varied by some motive power external to the system. In the latter case, for example, the voltages $d_1$, $d_2$ and $d_3$ may represent the coordinates of a moving point in one system of coordinates and the variables $x$, $y$, $z$ will then represent the coordinates of the same moving point in some other system of coordinates. In the homogeneous case where all the $d$'s are zero any one of the servos can be positioned arbitrarily and the system will automatically position all other servos so that the variables have ratios such as to satisfy the equations.

What is claimed is:

1. In combination, a group of potentiometers each varying in resistance per unit length in accordance with one variable of a series of simultaneous equations, voltage sources individually connected to said potentiometers to make the total voltage drops in said potentiometers proportional to the maximum values of the terms involving said variable, wipers individual to each potentiometer to select parts of said total voltage drops, said wipers being simultaneously and equally movable, a control device including a motor for moving said wipers, another group of potentiometers each varying in resistance per unit length in accordance with another variable of said series, voltage sources individually connected to said second group of potentiometers to make the total voltage drops in said potentiometers proportional to the maximum values of the terms involving said second variable, wipers individual to each potentiometer of said second group to select parts of said total voltage drops, said wipers being simultaneously and equally movable, a second control device including a motor for moving said wipers, a source of voltage proportional to an independent term of one of said equations, means for supplying the selected voltages from one potentiometer of each group, and the voltage from said last-mentioned source to said first control device, and means for supplying the selected voltages from another potentiometer of each group to said second control device.

2. In combination, a group of potentiometers respectively connected to voltage sources, wipers on said potentiometers for selecting voltages proportional to the terms involving one variable of a series of simultaneous equations, a control device including a motor for simultaneously and equally moving said wipers, a second group of potentiometers respectively connected to voltage sources, wipers on said second group of potentiometers for selecting voltages proportional to the terms involving a second variable of said series, a second control device including a motor for simultaneously and equally moving the wipers of said second group of potentiometers, means for supplying voltages from a potentiometer in each of said groups to said first control device and means for supplying voltages from another potentiometer in each of said groups to said second control device.

3. In combination, a first group of potentiometers, each having a winding and a wiper, voltage sources respectively connected across said windings, a first motor for simultaneously moving all the wipers of said first group, a second group of potentiometers, each having a winding and a wiper, voltage sources respectively connected across said second group of windings, a second motor for simultaneously moving all the wipers of said second group, means for applying the voltages selected by the wipers of one potentiometer in each group to control said first motor, and other means for applying the voltages selected by the wipers of another potentiometer in each group to control said second motor.

4. Apparatus for solving a plurality of simultaneous equations which are each equal to zero, which comprises means for developing voltages respectively proportional to the maximum values of the terms in said equations, means for selecting a variable part of the voltages representing each of the dependent variables and the independent variable making up one of the equations, means for adding said selected voltages, means for selecting a variable part of the voltages representing each of the dependent variables and the independent variable making up a second equation, means for adding said latter voltages, means for adjusting all the selection points for one of said dependent variables in accordance with the deviation of said first sum from zero and means for simultaneously adjusting all the selection points for another of said dependent variables in accordance with the deviation of said second sum from zero until both said deviations are reduced substantially to zero and the selection points indicate the values of the dependent variables.

CLARENCE A. LOVELL.

REFERENCES CITED

The following references are of record in the file of this patent:

FOREIGN PATENTS

| Number | Country | Date |
|--------|---------|------|
| 476,165 | Great Britain | Nov. 29, 1937 |

(Other references on following page)

OTHER REFERENCES

Russell and Wright, Electrical Device for Evaluating Formulae and Solving Equations, Phil. Mag., sixth series, vol. XVIII, 1909, pages 291 to 308, inclusive.

Wilbur, The Mechanical Solution of Simultaneous Equations, J. F. I., vol. 222, No. 6, December 1936, pages 715 to 724, inclusive.

Schooley, Electro-Mechanical Method for Solving Equations, R. C. A. Review, vol. III, No. 1, July 1938, pages 86 to 96, inclusive.

Herr et al., An Electrical Algebraic Equation Solver, R. S. I., vol. 9, October 1938, pages 310 to 315, inclusive.